C. T. ABBOTT.
AGRICULTURAL MACHINE.
APPLICATION FILED DEC. 20, 1916.

1,256,632.

Patented Feb. 19, 1918.
3 SHEETS—SHEET 1.

Inventor
C. T. Abbott

Witnesses

By
Attorneys

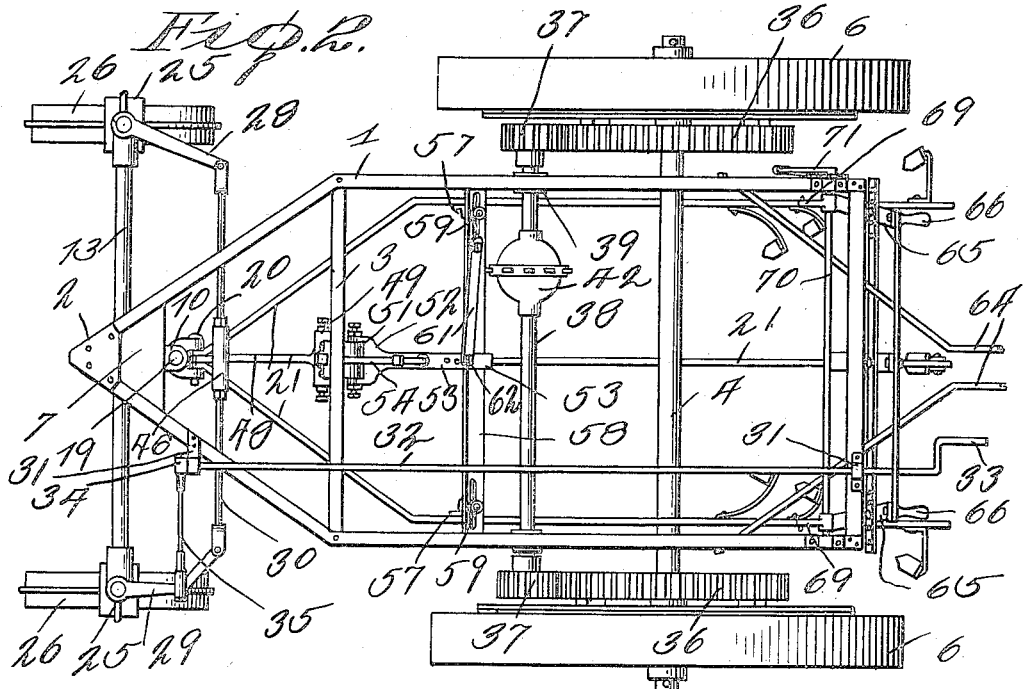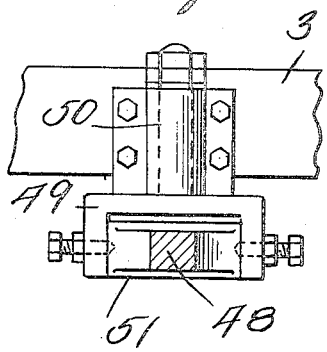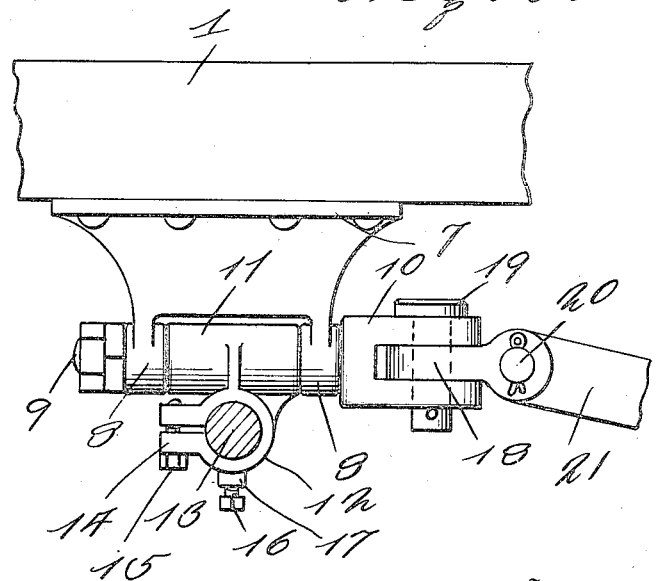

C. T. ABBOTT.
AGRICULTURAL MACHINE.
APPLICATION FILED DEC. 20, 1916.
1,256,632.
Patented Feb. 19, 1918.
3 SHEETS—SHEET 3.
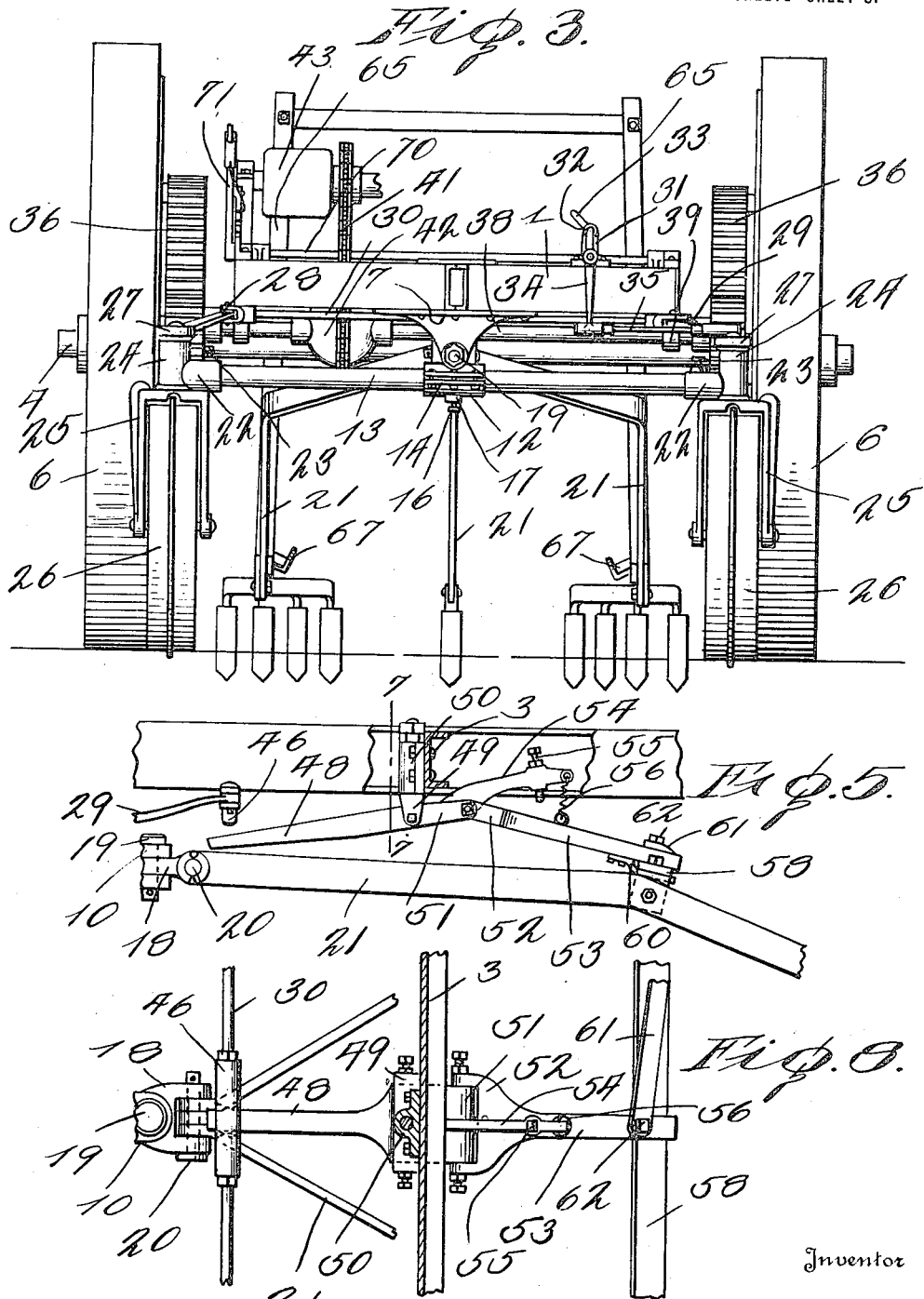
Witnesses
B. V. Brann
Inventor
C. T. Abbott
By Chandler & Chandler
Attorneys

UNITED STATES PATENT OFFICE.

CHARLIE T. ABBOTT, OF WOODSTOCK, ILLINOIS.

AGRICULTURAL MACHINE.

1,256,632.

Specification of Letters Patent.   Patented Feb. 19, 1918.

Application filed December 20, 1916.   Serial No. 138,008.

*To all whom it may concern:*

Be it known that I, CHARLIE T. ABBOTT, a citizen of the United States, residing at Woodstock, in the county of McHenry, State of Illinois, have invented certain new and useful Improvements in Agricultural Machines; and I do hereby declare the following to be a full, clear, and exact description of the invention, such as will enable others skilled in the art to which it appertains to make and use the same.

This invention relates to wheeled cultivators, and particularly to that class of machines in which the cultivator is traction driven.

The main object of the invention is to provide an improved double-row cultivator which carries its own motive power and is controlled for steering purposes by the adjustment of the cultivator gangs or gigs.

It is furthermore an object of the invention to construct a self-driven tractor in which an intimate association exists between the operative cultivating devices and a steering mechanism so that the apparatus is steered, practically, from the cultivating devices. More particularly it is the object of the invention to construct a two-row cultivator in which the action of placing the cultivator gangs into operative position automatically connects the gangs to the steering mechanism so that as the gangs or gigs are positioned to follow the rows, the vehicle will be likewise adjusted or steered to follow the rows. Also, it is an object to provide a four-wheeled tractor carrying cultivator gangs or gigs in association with a draw-bar located on or attached to the front axle and mechanism for operatively connecting the front steering wheels to the gigs or gangs.

With the above objects in view and such others as will hereinafter appear, my invention will now be fully set forth and described reference being had to the accompanying drawings.

In the drawing:—

Fig. 2 is a plan, with the engine removed,

Fig. 3 is a front view,

Fig. 4 is an enlarged detail of the front axle and draw-bar,

Fig. 5 is a partial side elevation showing the position of the parts, when the gangs or gigs are raised, Fig. 7 is an enlarged detail on line 7—7 of Fig. 5, Fig. 8 is an enlarged detail side elevation of an automatic steering mechanism.

Figure 1:
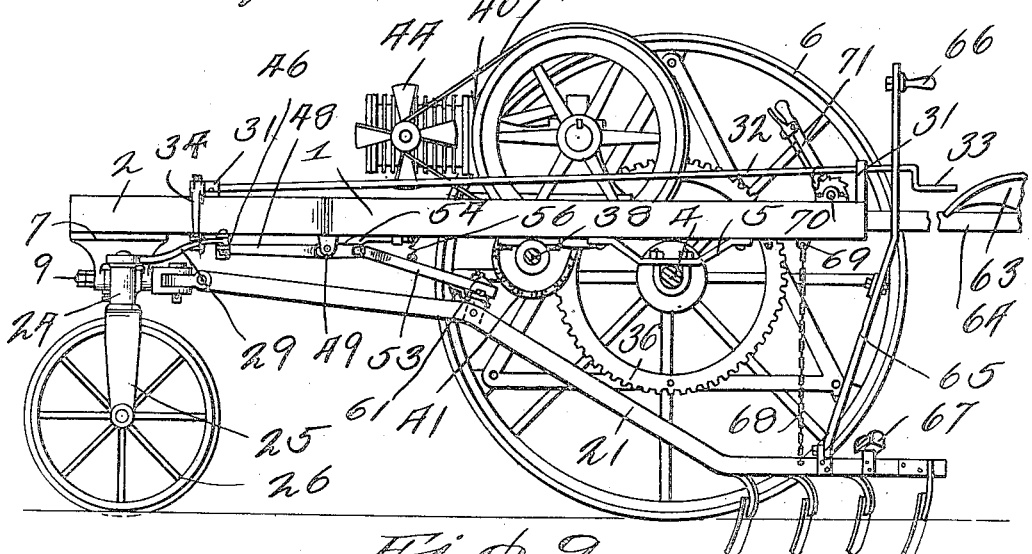
Figure 1 is a side elevation.
Figure 9:
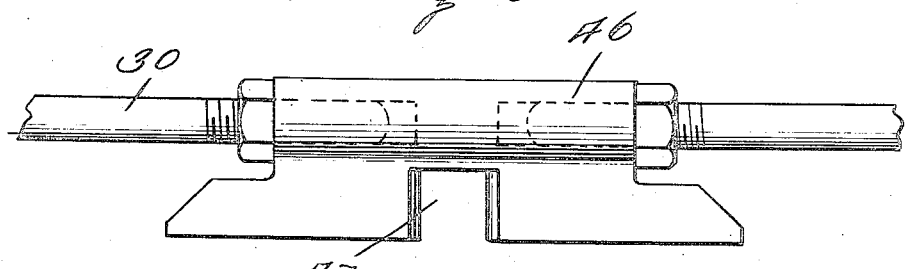
Fig. 9 is an enlarged detail view.
Figure 6:
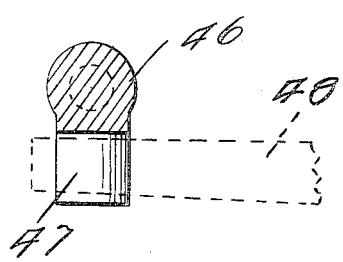
Fig. 6 is a rear view.

Referring more particularly to the drawings, 1 represents a horizontally disposed frame work consisting of a rectangular section and a forward triangular section 2, between which is disposed the cross bar 3. The frame work, generally is constructed of channel iron, and is supported at the rear upon an axle 4 which operates in the bearing brackets 5 secured below the side members of the frame 1. The axle 4 carries at its opposite ends the usual traction wheels 6. The peak of the triangular section 2 of the frame has secured to its lower face, the bearing plate 7 which terminates in downwardly extending bearings 8 which are alined longitudinally of the frame. Journaled in the bearings 8 is the shank 9 of a draw-bar head 10, and upon the shank 9 between the bearings 8 is journaled a sleeve 11 upon which depends the axle bearing 12, the latter extending transversely of the machine and receiving therein the front axle 13. The axle bearing 12 is in the form of a split sleeve, and on its split side is provided with the flanges 14 in which the set screws 15 are threaded in order to tighten the bearing 12 upon the axle 13. As a further tightening element, the set screw 16 is threaded into a suitable boss 17 formed upon the bearing 12 and may be set up against the axle 13. The draw-bar head 10 is a bifurcated element having upper and lower arms between which the laterally oscillated knuckle 18 is pivoted and is retained in position by means of a king pin 19. The knuckle 18 is vertically bifurcated to provide bearings for a bolt 20 upon which a series of cultivator beams or rig beams 21 are mounted so as to be vertically oscillatory, the beams being shaped to spread out below the frame 1 in fan shape and support the usual cultivator or other ground working tools.

As above indicated, the axle 13 is fixed, and supports at its ends, the knuckles 22 which are adjustably positioned by the medium of the set screw 23. The knuckles 22 carry the tubular bearings 24 in which the spindles of wheel forks 25 are rotatably extended so as to permit the steerage of the front wheels 26. The upper ends of the fork spindles are provided with the heads 27 from which the steering arms 28 and 29 project in rearward relation and are connected by the steering rod 30, whose particular construction will hereinafter appear. Extending from the rear of the frame to the front thereof and carried in brackets 31 is a steering crank shaft 32 which has at one end a crank 33 and at the other end carries a crank arm 34 whose free end is connected by means of the link 35 with the arm 29. Thus, a manual means is provided for steering the machine.

The axle 4 between the wheels 6 and the frame 1 is provided with the gear wheels 36 which mesh with pinions 37 mounted on the ends of a shaft 38 supported in bearings 39 secured to the frame below the side beams. The shaft 38 is driven by means of an engine 40 which, in the present construction is an air cooled internal combustion engine mounted upon the frame 1 and being connected to the shaft 38 by means of a chain 41, a differential 42 upon the shaft 38 being interposed between the latter and the chain drive. A transmission 43 provides a suitable control for the speed and direction of movement of the machine, and a fan 44 mounted in a bracket upon the frame 1 and driven by a belt 45 upon one of the fly wheels of the engine suitably cools the cylinder.

As an essential part of this invention, the steering rod 30 is constructed of two elements whose inner ends are threaded in axial alinement into a block 46, which constitutes a connection between the steering mechanism and an automatic control mechanism. The block 46 is a casting which extends below the steering rod elements and is provided with a middle longitudinal recess 47 into which a lock-bar 48 is adapted to engage. The recess 47 has its opposite faces beveled, so that when the end of the lock bar 48 is engaged therein, the steering rod 30 may be oscillated from side to side without binding the lock bar. The lock bar 48 is mounted to oscillate vertically in a hanger 49, which in turn has a vertical bearing in a bracket 50 which is secured to the front of the transverse beam 3 of the frame 1. In order to properly support the lock bar 48, the rear end of the latter which is pivoted between the arms of the hanger 49 is enlarged to provide the head 51 which extends rearwardly beyond the hanger 49 and has connected thereto, upon its opposite sides, the forked or yoked end 52 of a rock lever 53. Furthermore, the head 51 has rising and rearwardly extended therefrom an overhanging arm 54 which terminates in a threaded bearing for a screw 55 which is vertically operative in the arm to provide an adjustable stop for the relative movement between the rock arm 53 and the arm 54.

Also, a spring 56 interposed between the free end of the arm 54, and the rock arm 53 tends to normally throw the arms 54 and 53 into contacting relation. Mounted upon the inner faces of the outside rig beams 21 are the bearing blocks 57 whose ends are longitudinally slotted to receive the bolts 59 by means of which the tie bar is adjustably connected to the beams 21. The rear end of the rock lever 53 rests upon the upper surface of the tie bar 58 and is connected thereto for vertical movement by means of a slip yoke 60 which is bolted below the arm 53 and underlies the lower face of the tie bar 58. A torsion bar or link 61 pivotally connected to the top of the arm 53, as by the bolt 62, and to the tie bar 58 adjacent one end thereof provides a means for holding the automatic steering mechanism in alinement with the beams 21 without sacrificing the individual flexibility of the various beams 21 with relation to the remaining parts of the machine. The mechanism above described provides an automatic connection between the steering mechanism and the rig beams which is normally engaged for operation when the tools carried by the beams 21 are in operative engagement with the ground, as will later appear.

The machine above described may be operated from a walking position, or the operator may occupy the seat 63 which is carried by a rearwardly extending beam 64 suitably mounted upon the frame. The yoke 65 extending across the beams 21 and being provided with hand grips 66 constitutes a suitable means for controlling the beams 21, and also foot supports 67 mounted upon the beams 21 constitute a means for swinging the beams 21 from one side to the other in directing the cultivation of the ground. Chains 68 connected to the beams 21 have their upper ends looped to the arms 69 mounted upon stub shafts 70 to which are also connected the hand levers 71 whereby the beams 21 may be raised and lowered.

In the operation of my garden tractor, tools of any suitable character are mounted upon the beams 21, according to the ground to be tilled, cultivated or otherwise treated. Obviously, until the field of operations is reached, the beams 21 are maintained in upraised or inoperative position at which time the lock bar 48 is held out of engagement with the block 46. In order to hold the lock bar 48 out of engagement with the steering mechanism, the rock arm 53 is elevated with the beams 21 until it contacts with the adjusting screw 55, at which time it obviously carries the rear end of the lock bar upwardly, so that as the latter rocks within the hanger 49, its forward end is disengaged from the steering mechanism. With the parts in this relation, the tractor may be steered from the driver's seat by means of the crank 33. However, as soon as the beams 21 are lowered so that the tools carried thereby are in operative contact with the soil, the rock arm 53 is lowered therewith, said rock arm moving on its pivoted end until it is free from the set screw 55, and tensions the spring 56. The action of the spring 56 tends to rock the lock bar 48 in the hanger 49, and throw the forward end of the lock bar upwardly so that it will snap into locking engagement with the recess 47 in the block 46. As soon as this occurs, the steering mechanism is connected to the beams 21 through the medium of the lock bar 48, the rock arm 53, the tie bars 58 and the torsion link 61. Thus, as the operator manipulates the rear ends of the beams 21 through the medium of the yoke 65 or by means of the foot pedals 67 so as to follow the furrows, or the row which is being cultivated, the steering mechanism is automatically actuated to cause the front wheels 26 to follow the desired path of operative movement.

It is obvious that the above described machine constitutes a complete power tractive agricultural unit which is particularly adapted for the cultivation of small tracts, and that, additionally, the entire machine is easily within control of a single operator. Furthermore, the mechanism of the cultivating parts are particularly associated with the mechanism of the steering elements to such an extent that the slight adjustments which are necessary to cause the cultivating devices to follow the desired paths are immediately and automatically communicated to the steering mechanism so that it is not necessary for the ground working implements to operate against the diagonal of the machine. On the other hand, the machine is automatically steered to enhance the easy manipulation of the ground working tools. Additionally, the mechanism interposed between the steering mechanism and the ground working apparatus is so constructed that it automatically disassociates the two sets of elements when the ground working implements are drawn into operative position, so that the steering mechanism may be independently and manually actuated to transfer the machine from one field of operation to another. The interposed mechanism so connects the steering mechanism and the ground working implements that, while the coöperation between the former and the latter is a sensitive one, the racking or straining of one mechanism is not communicated to the other mechanism.

What I claim as my invention is:—

1. A cultivator comprising in combination, a wheeled frame, a steering mechanism therefor, a ground working mechanism carried by the frame, and means interposed between the steering mechanism and the ground working mechanism to be moved for the automatic connection of the former to the latter during the movement of the ground working mechanism into ground working position.

2. A cultivator comprising in combination, a wheeled frame, a steering mechanism therefor, a ground working mechanism carried by the frame, and means interposed between the steering mechanism and the ground working mechanism, whereby the latter is actuated to control or release the former upon the movement of the ground working mechanism into or out of ground working position respectively.

3. A cultivator comprising in combination, a wheeled frame, a steering mechanism therefor, a plurality of rig beams, and means yoking the outer rig beams together, a locking mechanism supported by the frame and adapted to operably engage the steering mechanism, and a pivoted connection between said yoking means and said locking means to connect the latter with the steering mechanism upon movement of the rig beams into ground working position.

4. A cultivator comprising in combination, a wheeled frame, a steering mechanism therefor, a ground working mechanism carried by the frame, and means suspended from the frame for vertical and horizontal oscillation and interposed between the steering mechanism and the ground working mechanism for the automatic connection of the former to the latter simultaneously with the movement of the ground working mechanism into operative position to permit the ground working mechanism to control the steering of the cultivator.

5. A cultivator comprising in combination, a wheeled frame, a steering mechanism therefor, a plurality of rig beams, a lock bar suspended from the frame for vertical and horizontal oscillation, and adapted to be swung into operative engagement with the steering mechanism, a rock lever pivotally connected to the lock bar, a torsion link coupling the rock lever to the yoking means, and a stop on the lock bar adapted to be engaged by the rock arm to lift the lock bar out of engagement with the steering mechanism simultaneously with the movement of the rig beams into inoperative position.

In testimony whereof I affix my signature in the presence of two witnesses.

CHARLIE T. ABBOTT.

Witnesses:
JOHN M. HOY,
F. V. GIESSELBRECHT.